United States Patent [19]
Dante

[11] 4,206,904
[45] Jun. 10, 1980

[54] BALL VALVE

[75] Inventor: Lucian J. Dante, Rockford, Ill.

[73] Assignee: Nyson Group Marketing, Ltd., Ongar, England

[21] Appl. No.: 869,357

[22] Filed: Jan. 13, 1978

[51] Int. Cl.² ............................................. F16K 5/06
[52] U.S. Cl. .................................... 251/315; 251/360
[58] Field of Search ............... 251/306, 315, 152, 360

[56] References Cited

U.S. PATENT DOCUMENTS

| | | | |
|---|---|---|---|
| 3,497,178 | 2/1970 | Priese | 251/315 |
| 3,538,940 | 11/1970 | Graham | 137/271 |
| 3,556,476 | 1/1971 | Haenky | 251/306 |
| 3,591,131 | 7/1971 | Carlson | 251/315 |
| 3,598,363 | 8/1971 | Shaw | 251/315 |
| 3,675,677 | 7/1972 | Scaramucci | 251/306 |
| 3,951,380 | 4/1976 | Oliva-Bonino | 251/315 |
| 3,967,812 | 7/1976 | Newell et al. | 251/306 |
| 4,078,763 | 3/1978 | Yamamoto | 251/315 |

*Primary Examiner*—William R. Cline
*Assistant Examiner*—H. Jay Spiegel
*Attorney, Agent, or Firm*—Kenyon & Kenyon

[57] ABSTRACT

A ball valve for use in isolating a hydronic circulator in a fluid heating system includes a ball pivotally mounted within a central passage through a housing. When the valve is open, a bore through the ball is aligned with the central passage. On one side of the ball, a pivot pin extends into a socket in the housing and on the other side, a stem connects with the ball for turning the ball into a closed position to block the central passage. A clip with a U-shaped notch interfits with a groove in the stem inside of the housing and acts between the passage and groove walls to keep the stem from being forced out of the housing by fluid pressure. Sealing the ball within the housing is a unitary member including both a retaining plate and a sealing ring which is sandwiched on opposite sides of the plate to provide sealing contact against the ball as well as between the plate and the housing, and externally of the housing for sealing between the plate and the circulator.

6 Claims, 4 Drawing Figures

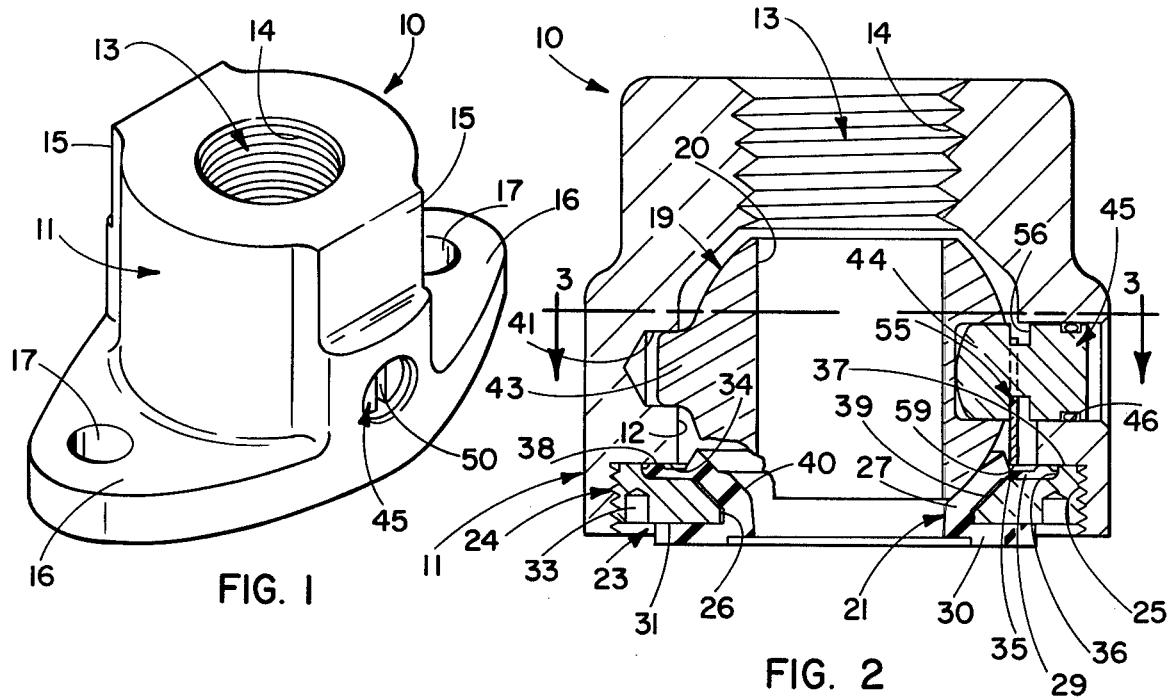
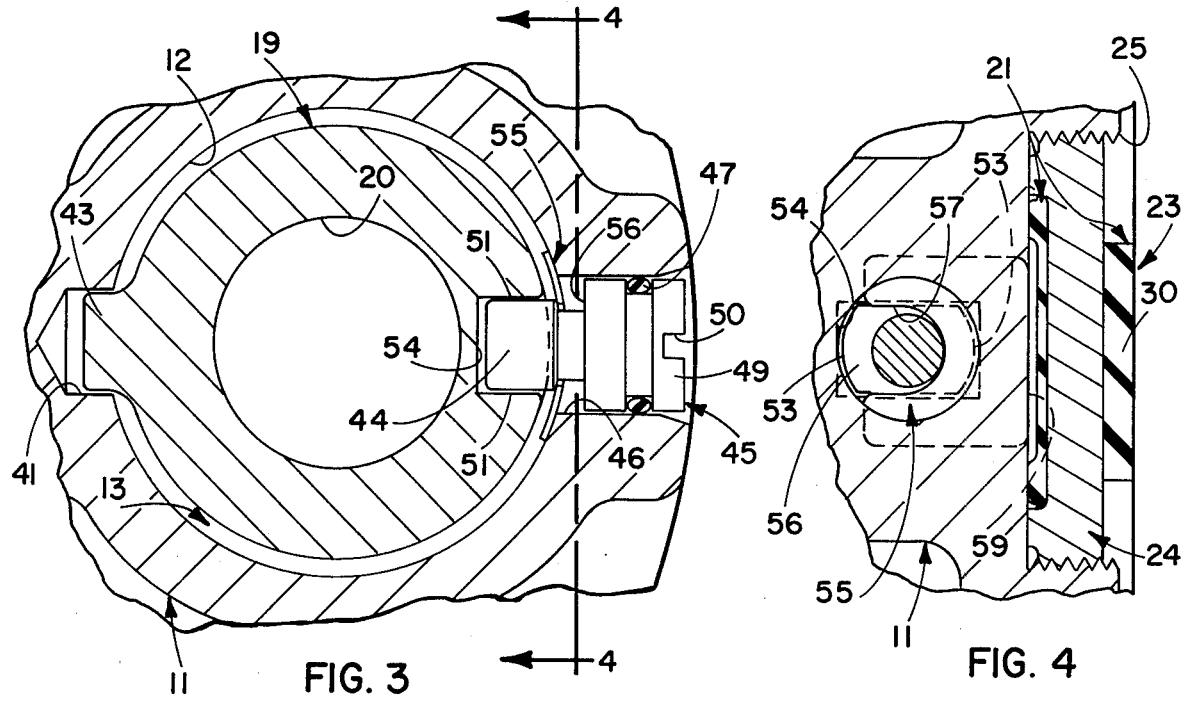

BALL VALVE

BACKGROUND OF THE INVENTION

The present invention relates generally to ball valves and, more particularly, to ball valves such as may be used in conjunction with a hydronic circulator to isolate the circulator from the heating system within which it is used so that the circulator may be removed such as for servicing without a substantial loss of fluid from the system.

SUMMARY OF THE INVENTION

The general aim of the present invention is to provide a new and improved ball valve which is easier and less expensive to manufacture and which makes installation and removal of a hydronic circulator in a fluid heating system much easier than prior ball valves of a similar type.

A more detailed object is to accomplish the foregoing by constructing the valve to include a unitary member for sealing against the leakage of system fluid to the outside of the valve housing, or toward the circulator when the valve is closed while also enabling easy replacement of the hydronic circulator in the heating system.

A further object is to provide a ball valve in which a retainer plate for supporting the ball in the valve housing is assembled as part of a unit with an elastomeric seal which coacts with the plate in the valve to seal at a plurality of locations, as well as between the valve and the circulator when the latter is secured to the valve.

The invention also resides in the novel manner of mounting the ball in the valve housing for turning between open and closed positions by means of a stem accessible from outside the housing and the provision of a unique clip to keep the stem from being forced out of the housing by fluid pressure.

Still further, the invention resides in the unique manner in which the clip is captivated within the housing by the retainer plate and unitary member so the clip is held against turning within the housing with the stem when pivoting the ball between its open and closed positions.

An additional advantage resides in the size relationships between the seal, the retainer plate and the valve housing so as to avoid overstressing of the seal when assembling the retainer plate and seal with the valve housing.

These and other objects and advantages will become more apparent from the following detailed description when taken in conjunction with the accompanying drawings.

BRIEF DESCRIPTION OF THE DRAWINGS

FIG. 1 is a perspective view of a ball valve embodying the novel features of the present invention.

FIG. 2 is a cross-sectional view of the ball valve shown in FIG. 1

FIGS. 3 and 4 are enlarged, fragmentary, cross-sectional views taken substantially along the lines 3—3 and 4—4 of FIGS. 2 and 3, respectively.

DETAILED DESCRIPTION OF THE PREFERRED EMBODIMENT

As shown in the drawings for purpose of illustration, the present invention is embodied in a ball valve 10 particularly adapted for use in a fluid heating system such as a hot-water system for isolating a hydronic circulator (not shown) so that the circulator may be removed from the system without a substantial loss of fluid. As shown in FIGS. 1 and 2, the ball valve 10 includes a housing 11 having a central passage 13 with a threaded port 14 formed at one end portion thereof and an enlarged ball receiving chamber 12 at the other end thereof. The outside of the housing adjacent the threaded port 14 is suitably shaped as with flats 15 for engagement by a wrench or similar tool to secure the valve to a system pipe. At the opposite end of the valve, integral flanges 16 protrude laterally from the housing and include openings 17 sized to receive screws for securing the valve to one side of the circulator. Typically, in a hydronic heating system two of the ball valves 10 are connected to the circulator, one valve being connected to the inlet side of the circulator and the other to the outlet side so that the circulator may be isolated from the system for removal and servicing.

For operation of the valve 10, a ball 19 is rotatably mounted within the housing 11 in the chamber 12 for movement between an open position, as shown in FIG. 2, to a closed position ninety degrees (90°) out of alignment with the open position. In the open position, a cylindrical bore 20 extending diametrically through the ball is aligned with the central passage 13 but, in the closed position the bore 20 extends perpendicular to the longitudinal axis of the passage 13 to block the flow of fluid through the valve. In the closed position, the ball engages a resiliently deformable sealing member 21 to keep fluid from leaking through the valve and out of the system should the circulator be removed.

The present invention contemplates a new and improved ball valve 10 particularly adapted for easy installation and servicing of the hydronic circulator while also being easier and less expensive to manufacture. For these purposes, a unique arrangement is provided for sealing the valve against leakage by utilizing a unitary member 23 to seal against leakage from a plurality of locations in the valve while also serving to seal between the valve housing and the circulator when the latter is connected to the valve. More specifically, the member 23 includes a retaining plate 24 and the sealing member or elastomeric ring 21 is sandwiched around the plate, thereby adapting the unitary member for two-sided sealing. Advantageously, on one side of the retaining plate 24, the ring 21 is positioned so as to seal between the retaining plate 24 and the housing as well as against the ball. On the other side of the retaining plate, the ring is positioned for sealing between the valve housing 11 and the circulator. With this arrangement, during assembly, fewer parts are handled making assembly easier and, field installation is simplified by avoiding the need for handling a separate seal between the valve and the circulator.

In the present instance, the retaining plate 24 (see FIG. 2) is circular in shape and is externally threaded to mate with internal threading of a circular recess 25 formed in the flange-end of the housing 11. A central aperture 26 in the plate is aligned axially with the valve passage 13 and an intermediate, annular section 27 of the sealing ring 21 is telescoped through the aperture to connect with radially extending inner and outer sections 29 and 30 of the ring. An outer face 31 of the retaining plate is planar in configuration except for the provision of spanner wrench holes 33 for use in turning the plate to seat against an end wall 34 of the housing recess 25. An inner face 35 of the retaining plate also is generally planar in shape, but, preferably, includes an annular recess 36 concentric with the central aperture 26 so as to define a peripheral shoulder 37. The inner section 29 of the ring extends into the recess 36 and adjacent the shoulder includes an inwardly protruding annular ridge 38. The unstressed thickness of the inner section 29 as measured through the ridge is greater than the height of the shoulder 37 for sealing between the retaining plate and the housing 11. Advantageously, when the plate is tightened in the recess 25, the shoulder 37 engages the end wall 34 of the housing recess 25, leaving space for the inner section 29 of the sealing ring so as to avoid overstressing of that section of the ring. In order to avoid overstressing of the outer section 30 of the ring, the depth of the recess 25 is greater than the thickness of the retaining plate 24 including the height of the shoulder 37. Accordingly, when mounting the valve 10 on a circulator, metal to metal contact of the flanges 16 with the circulator assures that a slight space between the valve housing 11 and the circulator will be provided.

As an aid in assembly and centering of the ball 19 on the sealing ring 21 for proper sealing, the sealing ring is sized to fit loosely on the retaining plate 24 and an inner edge 39 of the aperture 26 is chamfered. The intermediate section 27 of the sealing ring 21 is shaped to conform with the chamfered edge 39 thereby providing a tapered seat for the ball. Specifically, a slight shoulder 40 formed on the inside wall of the intermediate section serves as the sealing seat for the ball 19 and tends to center the ball against the seal. Advantageously, the radially loose fit of the sealing ring on the retaining plate allows the ring to shift slightly laterally to help keep the ball centered to assure proper sealing. By virtue of this construction, the need for extremely close manufacturing tolerance is avoided, thus lessening costs.

To mount the ball 19 pivotally within the chamber 12 of the housing 11 for movement between open and closed positions, a socket 41 (see FIGS. 2 and 3) is formed in the housing 11 to open into the chamber 12. Mating with the socket is a pivot pin 43 integrally formed with the ball so as to protrude in a generally radial direction from one side thereof. Diametrically of the pin, an inward end 44 of a stem 45 connects with the ball 19 to enable turning of the ball between its open and closed positions from outside of the housing 11. As shown in FIG. 3, the stem is supported in an opening 46 which extends through the housing in axial alignment with the socket 41 and is sealed within the opening by an O-ring seal 47. A driver slot 50 is formed in an outer end portion 49 of the stem and, preferably, is oriented directionally with the ball bore 20 so as to indicate the position of the ball in the housing. The inward end 44 of the stem 45 is shaped as a generally rectangular key including opposing flats 51 (see FIG. 3) and rounded sides 53 (see FIG. 4). A keyway formed in the ball 19 is of the same general cross-sectional shape as the key 44 and receives the key so that the ball may be turned in the chamber 12 between open and closed positions.

In accordance with another aspect of the present invention, the stem 45 is kept from being blown out of the valve housing 11 through the use of a novel clip 55. As shown in FIGS. 2 and 3, the clip 55 is mounted within the chamber 12 between the ball 19 and the opening 46 and extends into an annular groove 56 formed in the stem 45. Specifically, the clip coacts between the chamber wall around the opening 46 and the inward wall of the groove 56 so as to keep the stem from being forced by fluid pressure out of the housing 11 through the opening. As shown in FIG. 4, the clip is generally rectangular in shape and includes a U-shaped notch 57 which is received within the groove 56. Moreover, the clip is bowed, concave in an outward direction (see FIG. 3) to conform with the curvature of the chamber wall adjacent the opening 46. An edge 59 of the clip opposite the notch 57 is positioned adjacent the sealing ring 21 so that the clip is captivated within the chamber 12 against turning or otherwise disengaging from the stem 45 so as to assure retention of the stem in the opening regardless of the orientation of the valve housing 11 when attached to a circulator or rotation of the ball 19 when opening and closing the valve.

In view of the foregoing, it will be appreciated that the present invention brings to the art a new and improved ball valve 10 which not only is less expensive to manufacture but also is easier to use in the field such as when installing a hydronic circulator in a fluid heating system. To these ends, the ball valve includes a unique sealing arrangement with the unitary sealing member 23. Advantageously, the sealing ring 21 of the member 23 is sandwiched against opposite sides of the retaining plate 24 so as to provide a plurality of sealing contacts, one between the retaining plate and the housing 11, another between the ball 19 and the ring 21 and a third external to the housing 11 for sealing between the housing and the circulator. Additionally, the sealing ring and retaining plate coact with the clip 55 to captivate the clip within the chamber 12 against disengagement from the stem 45.

I claim:

1. A ball valve for use in isolating a hydronic circulator in a fluid heating system, said ball valve including a housing with a central passage having a port at one end thereof for connection to the heating system and an enlarged ball chamber formed at the other end thereof, a generally spherical ball with a bore extending therethrough, said ball being rotatably mounted within said chamber for movement between open and closed positions respectively, for permitting and blocking the flow of fluid through said housing and means for supporting and sealing said ball within said housing including a retaining plate secured to said housing opposite said port, and a resiliently deformable sealing member captivated on and sandwiching around opposite sides of said retaining plate to form sealing contact with said ball and between said plate and said housing and also for sealing engagement between the circulator and said housing, an opening formed through said housing and communicating with said chamber, a stem mounted within the opening and including inner and outer ends, a key formed in one of said inner end and said ball and a keyway formed in the other of said inner and said ball and receiving said key, said outer end being adapted for turning to rotate the ball between said open and closed positions and a clip having one edge located adjacent said retaining plate and said sealing member, said clip being generally rectangular in shape, bowed to conform with the shape of said chamber adjacent said opening and including a generally U-shaped notch formed in an edge opposite said one edge, an annular groove formed in said stem between the inner and outer ends thereof and said stem being received within said notch at said groove so as to keep said clip from turning with said stem when said ball is moved between said open and closed positions.

2. A ball valve as defined by claim 1 including a socket formed in one of said ball and said housing opposite said opening and communicating with said chamber, a pivot pin formed in the other of said ball and said housing and telescoped into said socket.

3. A ball valve as defined by claim 2 wherein said pivot pin, said socket, said keyway, and said opening are aligned with each other diametrically relative to said ball.

4. A ball valve as defined by claim 3 wherein said pivot pin and said keyway are formed in said ball.

5. A ball valve for use in isolating a hydronic circulator in a fluid heating system, said ball valve including a housing with a central passage having a port at one end thereof for connection to the heating system and an enlarged ball chamber formed at the other end thereof, a generally spherical ball with a bore extending therethrough, said ball being rotatably mounted within said chamber for movement between open and closed positions, respectively, for permitting and blocking the flow of fluid through said housing, a first recess formed in said housing in one side thereof opposite said port, a retaining plate having generally planar inner and outer faces, a central aperture extending therethrough, a chamfered edge formed around said opening in said inner face and said inner face including a second recess and having a peripheral shoulder for engagement with the end wall of said first recess, a generally ring-shaped resiliently deformable sealing member having inner and outer generally radially extending sections and an intermediate section extending through the aperture in the retaining plate and integrally connected with said inner and outer sections, the inner and outer sections of the sealing member engaging said inner and outer faces of the retaining plate respectively, the retaining plate and the sealing member being secured in said first recess in the housing and the first recess being of a depth greater than the thickness of the retaining plate, the intermediate section of the sealing member engaging with the ball to form a seal therebetween, the outer section being for sealing engagement between the circulator and said housing and the inner section of the sealing member being received within said second recess sandwiched between the inner face of the retaining plate and a radially extending end wall of said first recess, and including an annular ridge protruding therefrom in an inward direction into sealing contact between said plate and said housing.

6. A ball valve as defined by claim 5 wherein said intermediate section of said sealing ring is formed with an annular shoulder intermediate the ends thereof for sealing engagement with said ball.

* * * * *